Oct. 4, 1955

P. A. GROBEY 2,719,721

WORK HOLDER WITH PNEUMATIC WORK EJECTOR

Filed May 20, 1952

Inventor
Paul A. Grobey
by Wright, Brown, Quinby & May
Attys.

Oct. 4, 1955

P. A. GROBEY 2,719,721

WORK HOLDER WITH PNEUMATIC WORK EJECTOR

Filed May 20, 1952

Inventor
Paul A. Grobey
by Wright Brown Quinby & May
Attys.

United States Patent Office 2,719,721
Patented Oct. 4, 1955

2,719,721
WORK HOLDER WITH PNEUMATIC WORK EJECTOR

Paul A. Grobey, Springfield, Vt., assignor to Bryant Chucking Grinder Company, Springfield, Vt., a corporation of Vermont Application May 20, 1952, Serial No. 288,776

3 Claims. (Cl. 279—4)

This invention relates to work holders such as chucks and has for an object to provide pneumatic means for ejecting the work after it has been unclamped, and for subjecting the work piece and the surfaces of the holder with which it may contact to a current of air which tends to clean them so that accuracy in positioning of the work piece in the holder is made more certain.

For a complete understanding of this invention, reference may be had to the accompanying drawings in which Figure 1 is a fragmentary central longitudinal sectional view through a chuck and cooperating portions of a work spindle, and embodying the invention, the chuck being shown in closed condition.

Figure 2 is a view similar to a portion of Figure 1, but showing the chuck parts open.

Figures 3 and 4 are detail sectional views on lines 3—3 and 4—4, respectively, of Figure 1.

Figure 1:
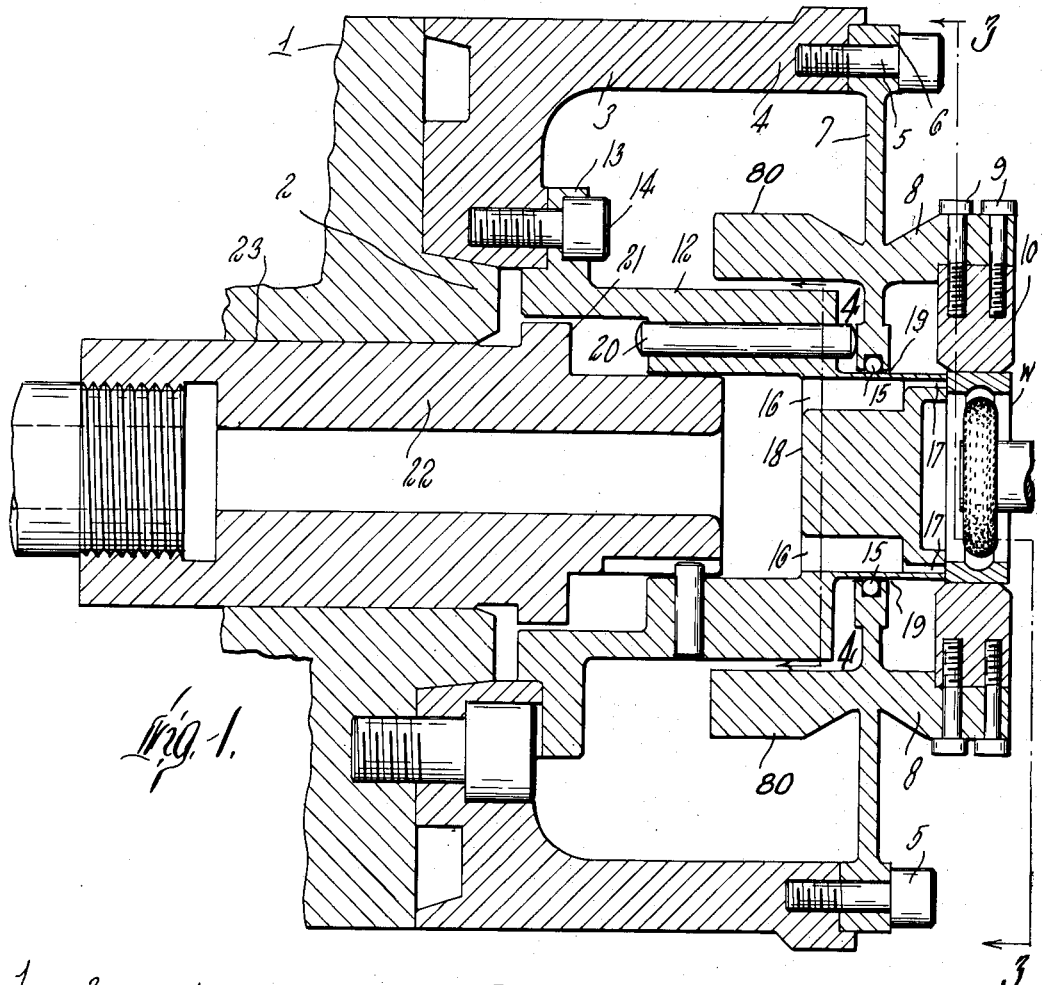

Referring first to Figures 1 to 4, at 1 is shown the forward portion of a rotary work spindle provided with a spindle nose 2 to which may be secured the rear face of a chuck 3. This chuck, as shown, comprises a body portion having a forwardly extending annular flange 4 to which is secured, as by screws 5, the outer marginal portion 6 of a diaphragm 7. This diaphragm 7 is provided with forwardly projecting jaws 8 to which are secured, as by screws 9, work-gripping elements 10, the inner faces of these elements 10, when the diaphragm 7 is in its undeflected position shown in Figure 1, being so spaced as to clamp therebetween a work piece W. The chuck also includes a cylindrical member 12 having at its rear portion an outwardly directed flange 13 which may be secured to the chuck body as by screws 14. This member 12 has a forwardly projecting central portion 18 which projects through a central aperture 19 in the diaphragm, a packing ring 15 being inserted therebetween. This portion 18 is provided with an annular row of perforations 16 which have reduced diameter forward extremities 17 which form nozzles directed toward the back face of the work piece W. The member 12 also carries slidable lengthwise of the axis of the chuck, a series of rods 20, the forward ends of which engage the back face of the diaphragm 7 closely adjacent to its central aperture 19. The rear ends of these rods 20 are arranged in alinement with a flange member 21 carried by a sleeve 22 movable axially through the axial bore 23 of the spindle. Outwardly of the member 12 the diaphragm has rearwardly extending counterweights 80 which tend to counteract by their own centrifugal force the centrifugal force exerted on the clamping jaws which would tend to open the chuck when the spindle and the chuck are being rotated.

Figure 2:
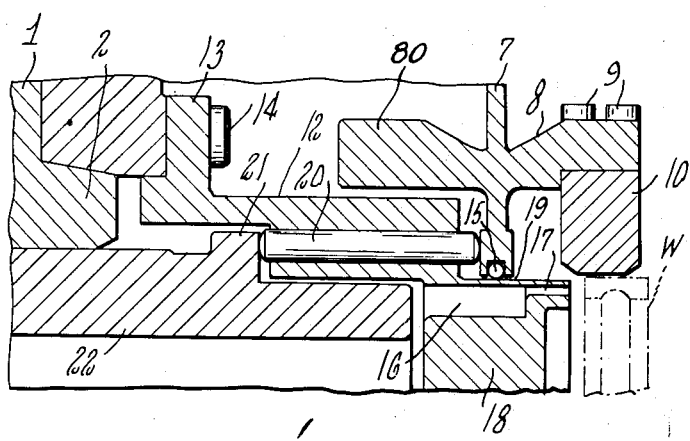
Figure 3:
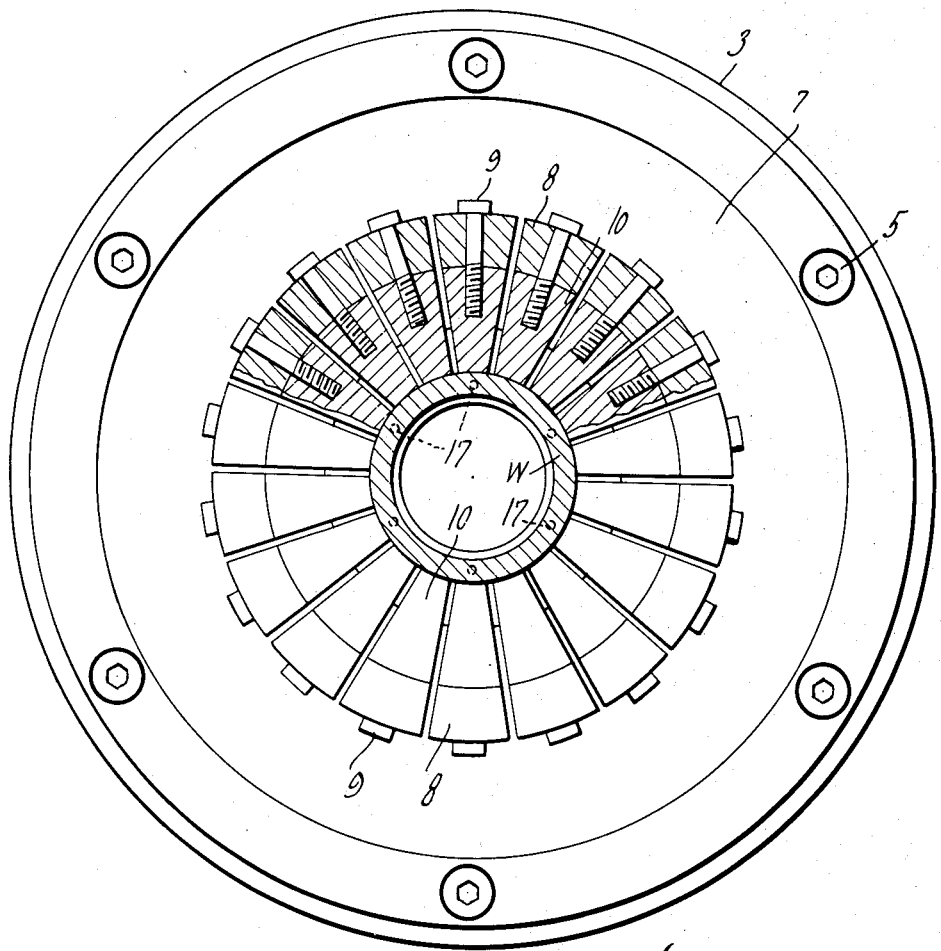
Figure 4:
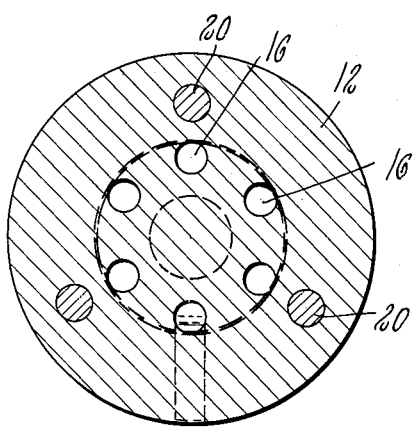

The member 22 is axially movable through the spindle and chuck between the positions shown in Figures 1 and 2. In Figure 1, the flange 21 is considerably back of the rear ends of the rods 20, so that these rods 20 do not exert pressure against the diaphragm so that the diaphragm remains in its unflexed work-clamping position. By moving the sleeve 22 forwardly to the position of Figure 2, however, these rods 20 are pushed forwardly against the back face of the diaphragm adjacent to its central aperture, causing the diaphragm to flex outwardly and forcing the work-clamping jaws outwardly to release a work piece. When this occurs a strong jet of air is passed through the sleeve 22, as will later be more fully described, which passes through the perforations 16 and their nozzle portions 17 against the rear face of the work piece thus forcing it out of its clamped position between the blocks 10.

Figure 5:
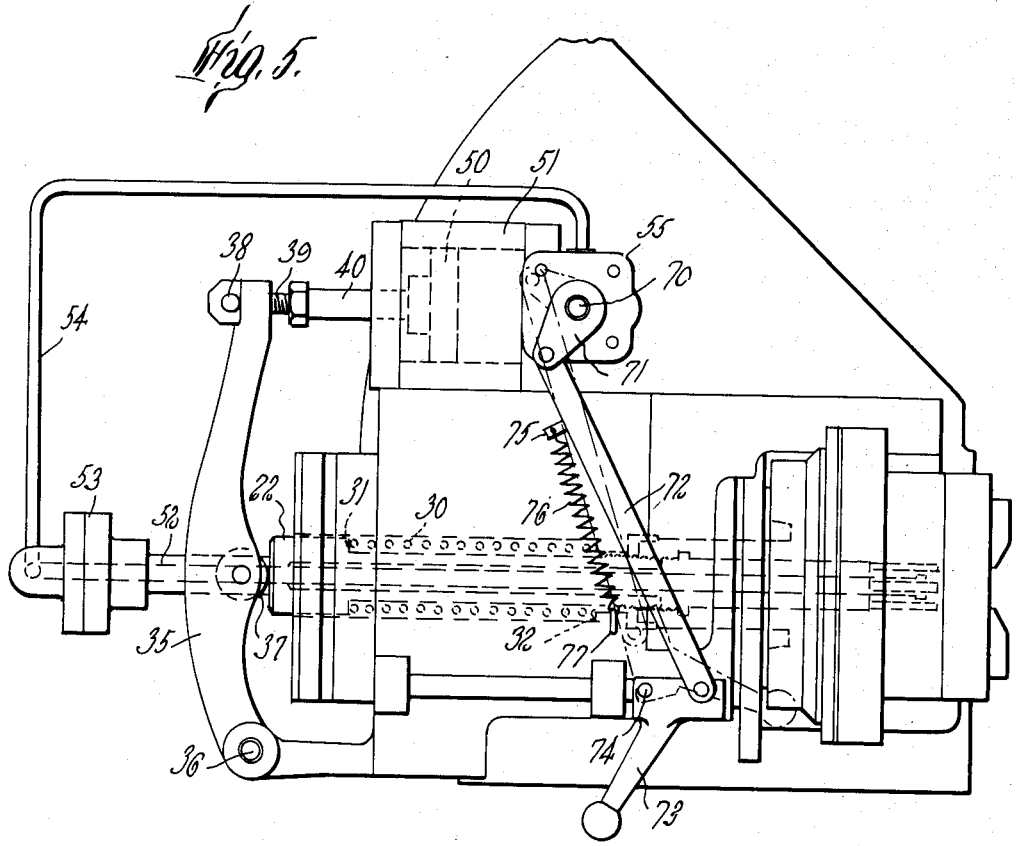
Figure 5 is a fragmentary top plan view of the work spindle portion of an internal grinder and showing certain of the control mechanism.
Figure 6:
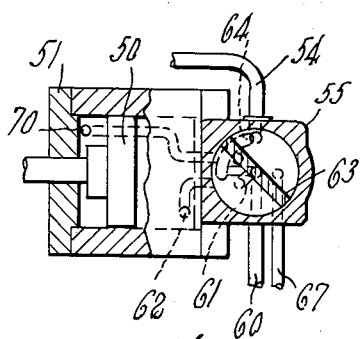
Figures 6 and 7 are fragmentary views partly in section showing certain of the pneumatic control and actuating mechanisms in grinding and loading conditions, respectively.
Figure 7:
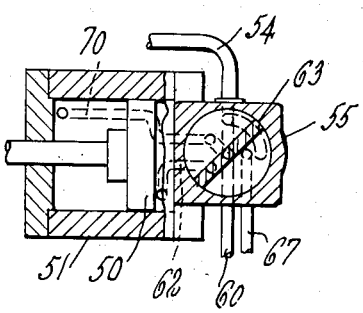

As shown in Figures 5 to 7, means may be provided for automatically causing the air under pressure to pass through the sleeve 22 and against the rear face of the work piece when the chuck is opened, and as will later more fully appear, a less strong current of air may be introduced therethrough at other times so as to tend to clear the back face of a work piece being inserted into grinding position and the forward face of the portion 18, which forms a backing against which the work piece is seated, free from dirt which might interfere with accurate placing of the work piece.

Referring to Figure 5, the rear end of the sleeve 22 is extended back through the spindle and is normally held pressed to its rearward position shown in Figure 1, as by a coil spring 30 reacting between the annular shoulder 31 thereof and a similar shoulder 32 on the spindle. Means for forcing the sleeve forwardly to open the chuck comprises a lever 35 fulcrumed on a fixed pivot 36 and having one or more rollers 37 engaging the rear face of the sleeve 22. The free end of the lever 35 is pivotally connected at 38 to an extension 39 of a piston rod 40. This piston rod 40 is attached to a piston 50 slidable within a pneumatic cylinder 51, so that by introducing air against the left hand face of the piston 50, the piston rod 40 may be pulled to the right as shown in Figure 7, causing the sleeve 22 to be moved from its chuck-closed position of Figure 1 to chuck-open position of Figure 2.

The sleeve 22 has a rearward extension 52 of reduced diameter leading into a stuffing box 53 which permits the sleeve 22 to rotate with the spindle while the stuffing box remains stationary. This stuffing box may have a pipe connection 54 to a controlling valve 55, so that at suitable times through this valve 55 air can be introduced through the stationary stuffing box into the rotary sleeve 22 to produce the work-ejecting and clearing operations as heretofore described.

Figures 6 and 7 show the valve 55 in grinding and loading conditions, respectively. In the grinding condition where the work piece is clamped, air from a suitable source of compressed air is delivered to the valve through the pipe 60. It passes through the valve port 61 into the passage 62 leading to the right hand face of the piston 50 so that this piston is now held in the position shown in Figure 5 which corresponds to the grinding position of Figure 1. Also from the left hand side of the valve partition 63 air passes through a restricted passage 64 into the pipe 54 so that a small flow of air is permitted through the pipe 54 and the sleeve 22, perforations 16 and nozzle 17, this air current being sufficient to tend to clean the back faces of the work piece and the backing member 18 when a new work piece is being inserted, but of insufficient strength to eject the work piece.

The valve is provided with a stem 70 to which is attached a crank arm 71 leading through a link 72 to an actuating handle 73 fulcrumed at 74 to a fixed portion of the machine. It is normally held in the position shown in Figure 5, as by a coil spring 76 attached at one end to an ear 75 projecting from the link 72 and at its other end to a fixed eye 77.

By turning the handle 73 into the dotted line position shown in Figure 5, however, the valve is turned to the position shown in Figure 7, where the supply pipe 60 is in full communication with the pipe 54 so that a strong current of air is projected against the back face of the work piece, and the passage 62 is cut off from the supply pipe 60 and opened to the discharge pipe 67, while the supply pipe 60 is connected through the passages as at 70 to the left hand face of the piston 50 which is driven to the right to effect the opening of the chuck. Thus when the operator has completed the grinding operation, he turns the handle 73 from the full line to the dotted line position which causes the chuck to be opened, and a strong air current to be projected against the back face of the work piece to eject it from the chuck. By returning this handle to the full line position of Figure 5, the chuck is again closed and the blast of air diminished as heretofore described.

From the foregoing description of an embodiment of this invention it should be evident to those skilled in the art that various changes and modifications may be made without departing from its spirit or scope.

I claim:

1. In combination, a chuck for holding a work piece, said chuck having a diaphragm and work clamping jaws carried on the forward face of said diaphragm, a member movable axially of said chuck in position to engage with the rear face of said diaphragm to deflect said diaphragm and open said paws to release the work piece therebetween, said diaphragm having a central aperture, a backing member carried by said chuck opposite to said aperture and against which the work piece may be seated and having openings therethrough opposite to said work piece, and means operatively connected to said axially movable member causing a stream of air to flow through said openings to eject the work piece when said axially movable member is moved to release the work piece.

2. In combination, a chuck for holding a work piece, said chuck having a diaphragm and work clamping jaws carried on the forward face of said diaphragm, a member movable axially of said chuck in position to engage with the rear face of said diaphragm to deflect said diaphragm and open said jaws to release the work piece therebetween, said diaphragm having a central aperture, a backing member carried by said chuck opposite to said aperture and against which the work piece may be seated and having openings therethrough opposite to said work piece, a fluid pressure motor operatively connected to said movable member to move said member, a source of pneumatic pressure, pipe connections between said motor and source including a control valve, pipe connections from said valve to said openings, and means operatively connected thereto for controlling said valve to simultaneously actuate said motor to move said movable member in work piece releasing direction and to cause air from said source to blow through said openings against said work piece.

3. In combination, a chuck for holding a work piece, said chuck having a diaphragm and work clamping jaws carried on the forward face of said diaphragm, a member movable axially of said chuck in position to engage with the rear face of said diaphragm to deflect said diaphragm and open said jaws to release the work piece therebetween, said diaphragm having a central aperture, a backing member carried by said chuck opposite to said aperture and against which the work piece may be seated and having openings therethrough opposite to said work piece, a fluid pressure motor operatively connected to said movable member to move said member, a source of pneumatic pressure, pipe connections between said motor and source including a control valve, pipe connections from said valve to said openings, and means operatively connected thereto for controlling said valve to simultaneously actuate said motor to move said movable member in work piece releasing direction and to cause air from said source to blow through said openings against said work piece, said valve being arranged to pass a reduced amount of air through said openings when in position to retain said axially movable member in work-clamping position.

References Cited in the file of this patent

UNITED STATES PATENTS

| 926,761 | Oliver | July 6, 1909 |
| 2,491,611 | Hohwart et al. | Dec. 20, 1949 |